(12) United States Patent
Kim

(10) Patent No.: US 11,681,935 B2
(45) Date of Patent: Jun. 20, 2023

(54) APPARATUS FOR DATA ANALYSIS AND METHOD THEREOF

(71) Applicant: SAMSUNG SDS CO., LTD., Seoul (KR)

(72) Inventor: Eun Mi Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 436 days.

(21) Appl. No.: 16/885,747

(22) Filed: May 28, 2020

(65) Prior Publication Data

US 2021/0365809 A1 Nov. 25, 2021

(30) Foreign Application Priority Data

May 20, 2020 (KR) .................. 10-2020-0060262

(51) Int. Cl.
*G06N 5/00* (2023.01)
*G06N 5/04* (2023.01)
*G06N 5/02* (2023.01)

(52) U.S. Cl.
CPC .................. *G06N 5/04* (2013.01); *G06N 5/02* (2013.01)

(58) Field of Classification Search
None
See application file for complete search history.

(56) References Cited

U.S. PATENT DOCUMENTS

| | | | | |
|---|---|---|---|---|
| 8,417,715 | B1 * | 4/2013 | Bruckhaus | G06Q 10/04 705/26.1 |
| 9,563,652 | B2 * | 2/2017 | Morimoto | G06F 16/24578 |
| 10,133,791 | B1 * | 11/2018 | Chan | G06F 16/22 |
| 10,354,192 | B2 * | 7/2019 | Livingston | G06N 5/04 |
| 10,986,144 | B1 * | 4/2021 | Lee | H04L 65/4015 |
| 2005/0096950 | A1 * | 5/2005 | Caplan | G06Q 10/06395 705/7.41 |
| 2009/0158179 | A1 * | 6/2009 | Brooks | G06Q 30/0245 715/762 |
| 2016/0292197 | A1 * | 10/2016 | Morimoto | G06F 16/24578 |
| 2016/0307210 | A1 * | 10/2016 | Agarwal | G06Q 10/06316 |
| 2017/0286503 | A1 * | 10/2017 | Koukoumidis | G06F 16/21 |
| 2017/0316319 | A1 * | 11/2017 | Livingston | G06N 5/04 |
| 2018/0129738 | A1 * | 5/2018 | Takeda | G06F 16/35 |
| 2018/0129978 | A1 * | 5/2018 | Vigoda | G06N 7/005 |
| 2018/0137161 | A1 * | 5/2018 | Schwan | G06F 16/215 |
| 2018/0268293 | A1 * | 9/2018 | Noda | G06N 7/005 |
| 2018/0357205 | A1 * | 12/2018 | Yamamoto | G06F 17/18 |
| 2019/0079979 | A1 * | 3/2019 | Chan | G06Q 50/18 |
| 2019/0197047 | A1 * | 6/2019 | Yamashita | G06F 16/285 |
| 2020/0019911 | A1 * | 1/2020 | Powers | G06F 16/24578 |
| 2021/0191933 | A1 * | 6/2021 | Kato | G06F 16/2465 |

FOREIGN PATENT DOCUMENTS

KR 10-2020-0047006 A 5/2020

\* cited by examiner

*Primary Examiner* — Gurkanwaljit Singh
(74) *Attorney, Agent, or Firm* — The PL Law Group, PLLC

(57) ABSTRACT

A method performed by a data analysis apparatus according to an embodiment of the present disclosure includes generating a plurality of module combination processes using a plurality of data analysis modules defined by a user, calculating a score for each of the data analysis modules based on an execution result of the plurality of module combination processes and generating a recommendation module candidate group including a combination of data analysis modules selected based on the score.

16 Claims, 13 Drawing Sheets

$$\text{Score}(i) = \frac{w1 \cdot \text{ACP}(i)}{w2 \cdot \alpha + w2 \cdot \beta} \cdot \frac{e}{\text{Elapsed time}(i)} \longleftarrow 51$$

$$Score(i) = \frac{w1 \cdot ACP(i)}{w2 \cdot \alpha + w2 \cdot \beta} \cdot \frac{e}{Elapsed\ time(i)}$$

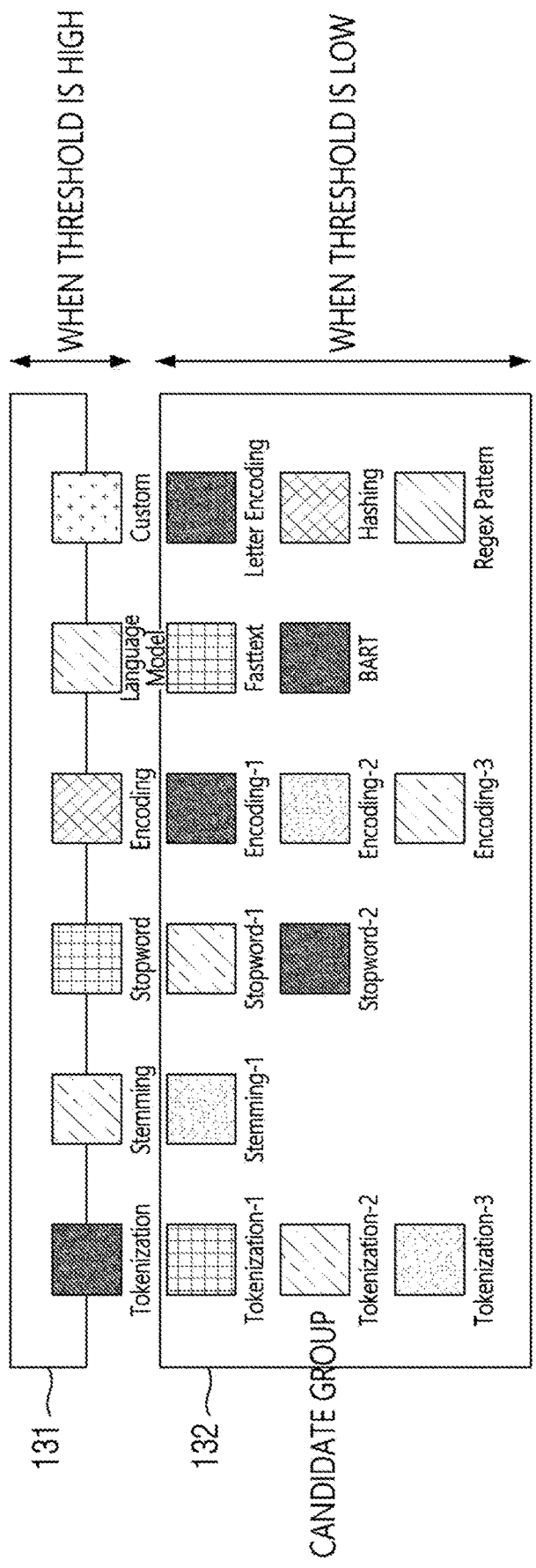

APPARATUS FOR DATA ANALYSIS AND METHOD THEREOF

CROSS REFERENCE TO RELATED APPLICATIONS AND CLAIM OF PRIORITY

This application claims priority to and the benefit of Korean Patent Application No. 10-2020-0060262, filed on May 20, 2020, the disclosure of which is incorporated herein by reference in its entirety.

1. Field

The present invention relates to a data analysis apparatus and its data analysis method, and more particularly, to a data analysis apparatus and its data analysis method for automating the data analysis process.

2. Description of the Related Art

The general data analysis process goes through the steps of data pre-processing, analysis model development, and post-processing, and it is necessary to perform iterations several times until a meaningful experiment result is obtained because the experimental variables vary when performing each step.

Even in the case of performing an independent data analysis step, since the number of variables combinations increases exponentially in proportion to the complexity of the experiment, the same analysis process is repeated.

Further, even if the analysis model development is completed stably, it is repeatedly performed by changing dozens to hundreds of methods according to the experimental plan of the data pre-processing and post-processing steps.

In order to automate the entire process of data analysis, it is impossible by simply changing the variables, and there is a problem in that it is necessary to pay an exponentially increasing time and cost even if all of the changeable cases are performed.

Further, there are inefficiencies that beginner analysts need to compare the results through several experiments in order to apply the optimal analysis method among various analysis methods available at each stage of the data analysis process.

SUMMARY

The technical problem to be solved by the present invention is to provide a data analysis apparatus and a data analysis method thereof for automating the entire process of data analysis.

Another technical problem to be solved by the present invention is to provide a data analysis apparatus and a data analysis method thereof that can recommend an optimal analysis method that can be used in each step of the data analysis process.

Another technical problem to be solved by the present invention is to provide a data analysis apparatus and a data analysis method thereof that can shorten the time required to perform each step of the data analysis process.

The technical problems of the present invention are not limited to the technical problems mentioned above, and other technical problems not mentioned will be clearly understood by those skilled in the art from the following description.

According to an aspect of the inventive concept, there is provided a method performed by a data analysis apparatus. The method comprises generating a plurality of module combination processes using a plurality of data analysis modules defined by a user, calculating a score for each of the data analysis modules based on an execution result of the plurality of module combination processes, and generating a recommendation module candidate group including a combination of data analysis modules selected based on the score.

According to another aspect of the inventive concept, there is provided a method, wherein each of the plurality of data analysis modules includes a minimum unit analysis algorithm used in connection with classification, clustering and an embedding vector.

According to another aspect of the inventive concept, there is provided a method, wherein generating the plurality of module combination processes comprises, setting the module combination processes using all the analyzable combinations of each of the data analysis modules.

According to another aspect of the inventive concept, there is provided a method, wherein generating the plurality of module combination processes comprises, generating a module parameter array including parameter information for each of data analysis modules included in the respective module combination processes.

According to another aspect of the inventive concept, there is provided a method, wherein generating the module parameter array comprises, generating a three-dimensional array having the data analysis module, a maximum length of a parameter field corresponding to the respective data analysis modules and an embedding space as each dimension; and initiating the three-dimensional array.

According to another aspect of the inventive concept, there is provided a method, wherein calculating a score for each of the data analysis modules comprises, acquiring information on accuracy and elapsed time for each of the module combination processes by executing the plurality of module combination processes based on the module parameter array, calculating contribution of each of the data analysis modules using the information on accuracy and elapsed time, and estimating a score for each of the data analysis modules based on the contribution.

According to another aspect of the inventive concept, there is provided a method, wherein calculating a score for each of the data analysis modules further comprises, updating parameter information of each of the data analysis modules included in the module parameter array based on a difference value between accuracy of each of the module combination processes.

According to another aspect of the inventive concept, there is provided a method, wherein calculating a score for each of the data analysis modules comprises, updating parameter information of a data analysis module included in each of the module combination processes using a back propagation method.

According to another aspect of the inventive concept, there is provided a method, wherein generating the recommendation module candidate group comprises, selecting a predetermined number of data analysis modules having a high score among the plurality of data analysis modules based on the calculated score.

According to another aspect of the inventive concept, there is provided a method, wherein generating the recommendation module candidate group comprises, setting a threshold value based on accuracy for each of the module combination processes, and adjusting the number of the recommendation module candidate group based on the threshold value.

According to an aspect of the inventive concept, there is provided a data analysis apparatus. The data analysis apparatus comprises one or more processors, a communication interface communicating with an external device, a memory for loading a computer program performed by the processor, and a storage for storing the computer program, wherein the computer program comprises instructions for performing operations comprising, generating a plurality of module combination processes using a plurality of data analysis modules defined by a user, calculating a score for each of the data analysis modules based on an execution result of the plurality of module combination processes, and generating a recommendation module candidate group including a combination of data analysis modules selected based on the score.

According to another aspect of the inventive concept, there is provided a data analysis apparatus, wherein each of the plurality of data analysis modules includes a minimum unit analysis algorithm used in connection with classification, clustering and an embedding vector.

According to another aspect of the inventive concept, there is provided a data analysis apparatus, wherein generating the plurality of module combination processes comprises, setting the module combination processes using all the analyzable combinations of each of the data analysis modules.

According to another aspect of the inventive concept, there is provided a data analysis apparatus, wherein generating the plurality of module combination processes comprises, generating a module parameter array including parameter information for each of data analysis modules included in the respective module combination processes.

According to another aspect of the inventive concept, there is provided a data analysis apparatus, wherein generating the module parameter array comprises, generating a three-dimensional array having the data analysis module, a maximum length of a parameter field corresponding to the respective data analysis modules, and an embedding space as each dimension, and initiating the three-dimensional array.

According to another aspect of the inventive concept, there is provided a data analysis apparatus, wherein calculating a score for each of the data analysis modules comprises, acquiring information on accuracy and elapsed time for each of the module combination processes by executing the plurality of module combination processes based on the module parameter array, calculating contribution of each of the data analysis modules using the information on accuracy and elapsed time, and estimating a score for each of the data analysis modules based on the contribution.

According to another aspect of the inventive concept, there is provided a data analysis apparatus, wherein calculating a score for each of the data analysis modules further comprises, granting a reward or penalty for each of the module combination processes based on accuracy of each of the module combination processes.

According to another aspect of the inventive concept, there is provided a data analysis apparatus, wherein calculating a score for each of the data analysis modules comprises, updating parameter information of a data analysis module included in each of the module combination processes using a back propagation method.

According to another aspect of the inventive concept, there is provided a data analysis apparatus, wherein generating the recommendation module candidate group comprises, selecting a predetermined number of data analysis modules having a high score among the plurality of data analysis modules based on the calculated score.

According to another aspect of the inventive concept, there is provided a data analysis apparatus, wherein generating the recommendation module candidate group comprises, setting a threshold value based on accuracy for each of the module combination processes; and adjusting the number of the recommendation module candidate group based on the threshold value.

BRIEF DESCRIPTION OF THE DRAWINGS

FIG. 14 is an example of a specific operation performed by the analysis unit described with reference to FIG. 13.

DETAILED DESCRIPTION

Figure 1:
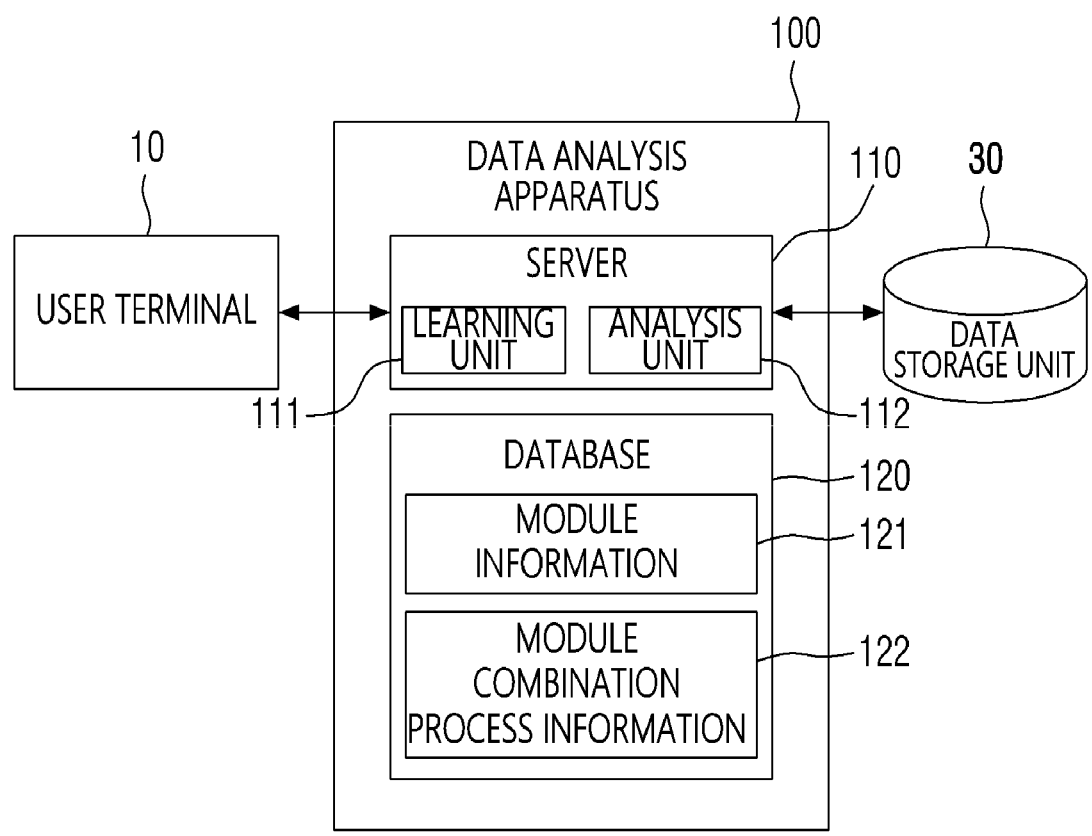
FIG. 1 is a block diagram showing the configuration of a data analysis apparatus according to an embodiment of the present invention.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected." "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a block diagram showing the configuration of a data analysis apparatus according to an embodiment of the present invention. Referring to FIG. 1, according to an embodiment of the present invention, the data analysis apparatus 100 includes a server 110 and a database 120, processes a data analysis request received from a user terminal 10, and provides a result for that.

The server 110 is a fixed computing device, and is connected to the user terminal 10 and the data storage unit 30 through a network. The server 110 performs data analysis for the data analysis request received from the user terminal 10 by using data stored in the data storage unit 30. The server 110 may be implemented as a device dedicated to machine learning capable of performing statistical analysis and artificial intelligence algorithms.

The data storage unit 30 may be implemented as a separate external device or a DB server connected to the data analysis device 100 through a network, and may store data generated in a business environment in various fields.

At this time, the data stored in the data storage unit 30 may include all data in the form of text or images, and may include data of all storable form without limiting to the form of data.

The server 110 may receive data from the data storage unit 30 in a predetermined periodic unit, or may request required data to the data storage unit 30 whenever a request from the user terminal 10 occurs.

The server 110 may perform various stages of analysis, such as data pre-processing, analysis model development, and post-processing stages, for the data received from the data storage unit 30 and provide the analysis result to the user terminal 10 accordingly.

The server 110 includes components of the learning unit 111 and the analysis unit 122. The learning unit 111 defines a data analysis module that is a minimum classification unit for data analysis, and calculates a score for each data analysis module through a search process for an analysis method using the data analysis module. The analysis unit 112 generates a recommendation module candidate group including a combination of optimal data analysis modules in the order of highest score of each data analysis module calculated in the learning unit 111.

The database 120 stores module information 121 for analyzing data received from the user terminal 10 by the server 110 and module combination process information 122. Here, the module information 121 is information on the analysis algorithm of the minimum unit used for data analysis, and may be received from the user terminal 10 or pre-registered and stored in the server 110 by a plurality of users. In one embodiment, the module information may include information on an analysis method such as classification, clustering, and a bag of word embedding vector for analysis of text data. Further, the module information may include information on an analysis method such as classification, clustering, and an embedding vector for analysis of image data.

The module combination process information 122 is information on a plurality of module combination processes generated using modules stored in the module information 121 and may be received and stored from the user terminal 10. The user terminal 10 may generate a module combination process in the form of a graph image through a user interface, and transmit information on the module combination process generated in the form of a graph image to the server 110.

As such, the database 120 may be implemented as a DB server that stores all information related to data analysis processed by the data analysis apparatus 100.

The user terminal 10 may be any one of a fixed computing device such as a personal desktop PC and a mobile computing device such as a smart phone, a tablet PC, a laptop PC, a PDA, a virtual reality (VR) imaging device and an augmented reality (AR) imaging device. The user terminal 10 generates and provides information on modules for data analysis and information on a plurality of module combination processes to the server 110 of the data analysis apparatus 100, and may be implemented as a terminal of a manager who makes a decision or a terminal of an employee who performs data analysis using information on the recommendation module candidate group provided from the server 100.

As described above, by the configuration of the data analysis apparatus 100 according to the embodiment of the present invention, it is possible to automate the entire process of data analysis. Further, it is possible to recommend the optimal analysis method that can be used at each stage of the data analysis process.

Figure 2:
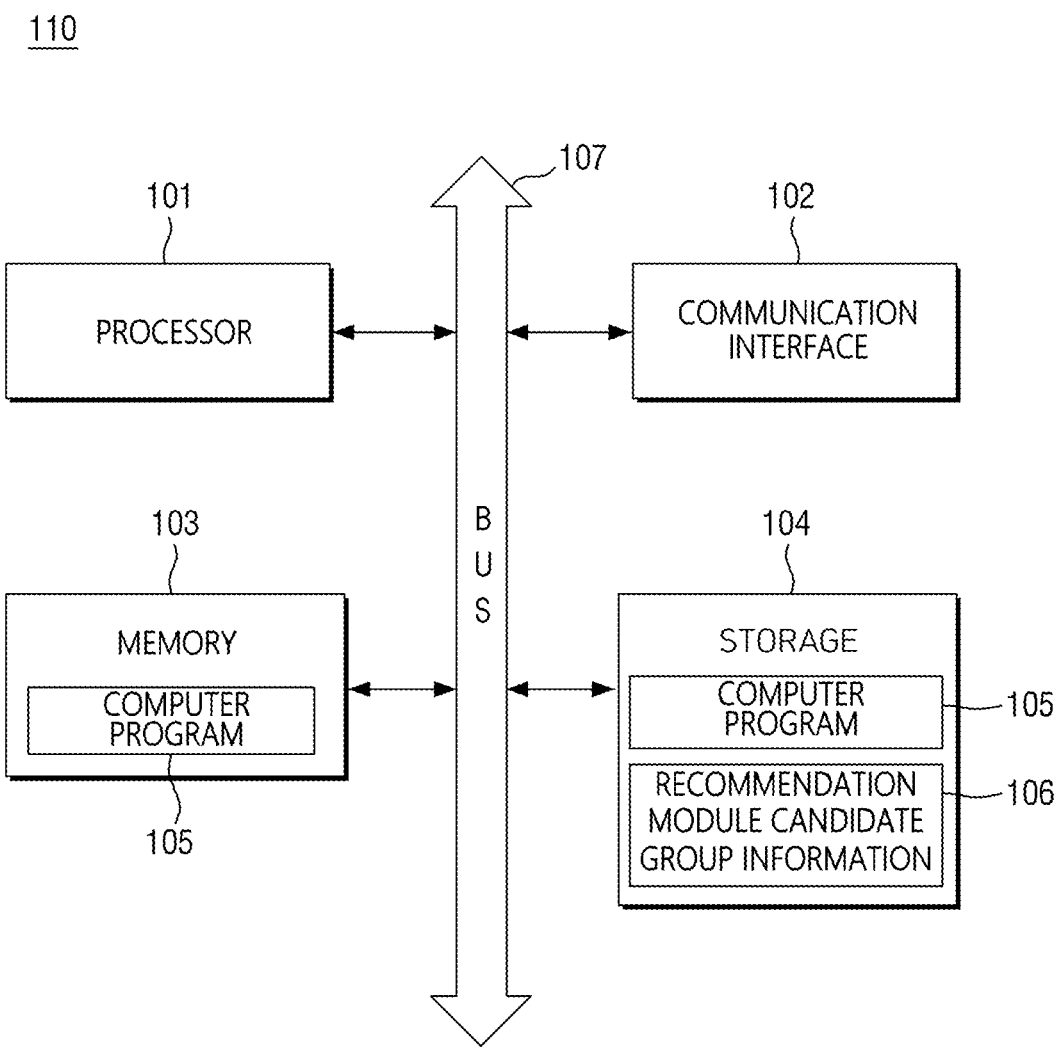
FIG. 2 is a configuration diagram showing a hardware configuration of the data analysis apparatus described with reference to FIG. 1.

FIG. 2 is a configuration diagram showing a hardware configuration of the data analysis apparatus described with reference to FIG. 1.

Referring to FIG. 2, the server 110 of the data analysis apparatus 100 is a computing device and the data analysis apparatus 100 may include one or more processors 101, a bus 107, a communication interface 102, a memory 103, which loads a computer program 105 executed by the processors 101, and a storage 104 for storing the computer program 105. However, FIG. 2 illustrates only the components related to the embodiment of the present disclosure. Therefore, it will be appreciated by those skilled in the art that the present disclosure may further include other general purpose components in addition to the components shown in FIG. 2.

The processor 101 controls overall operations of each component of the server 110 of the data analysis apparatus 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. the server 110 of the data analysis apparatus 100 may have one or more processors.

The memory 103 stores various data, instructions and/or information. The memory 103 may load one or more programs 105 from the storage 104 to execute methods/operations according to various embodiments of the present disclosure. For example, when the computer program 105 is loaded into the memory 103, the logic (or the module may be implemented on the memory 103. An example of the memory 103 may be a RAM, but is not limited thereto.

The bus 107 provides communication between components of the server 110 of the data analysis apparatus 100. The bus 107 may be implemented as various types of bus such as an address bus, a data bus and a control bus.

The communication interface 102 supports wired and wireless internet communication of the server 110 of the data analysis apparatus 100. The communication interface 102 may support various communication methods other than internet communication. To this end, the communication interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, in which methods/operations according to various embodiments of the present invention are implemented. For example, the computer program 105 may comprise instructions for performing an operation of generating a plurality of module combination processes using a plurality of data analysis modules defined by a user, an operation of calculating a score for each data analysis module based on execution results of the plurality of module combination processes, and an operation of generating a recommendation module candidate group including a combination of data analysis modules selected based on the score.

As an embodiment, the operation of generating a plurality of module combination processes may comprise an operation of generating a module parameter array including parameter information for each data analysis module included in each module combination process.

In one embodiment, the operation of calculating a score for each data analysis module may comprise an operation of acquiring information on accuracy and elapsed time for each module combination process by executing a plurality of module combination processes based on the module parameter array, an operation of calculating the contribution of each data analysis modules using information on accuracy and elapsed time and an operation of estimating a score for each data analysis modules based on the contribution. Here, an operation of granting a reward or penalty for each module combination process based on the accuracy of each module combination process may be further comprised.

At this time, in granting a reward or penalty for each module combination process, parameter information of the data analysis module included in each module combination process may be updated using a back propagation method.

As an embodiment, the operation of generating the recommendation module candidate group may comprise an operation of setting a threshold value based on accuracy for each module combination process and an operation of adjusting the number of the recommendation module candidate group based on the threshold value.

When the computer program 105 is loaded on the memory 103, the processor 101 may perform the methods/operations in accordance with various embodiments of the present disclosure by executing the one or more instructions.

Figure 3:
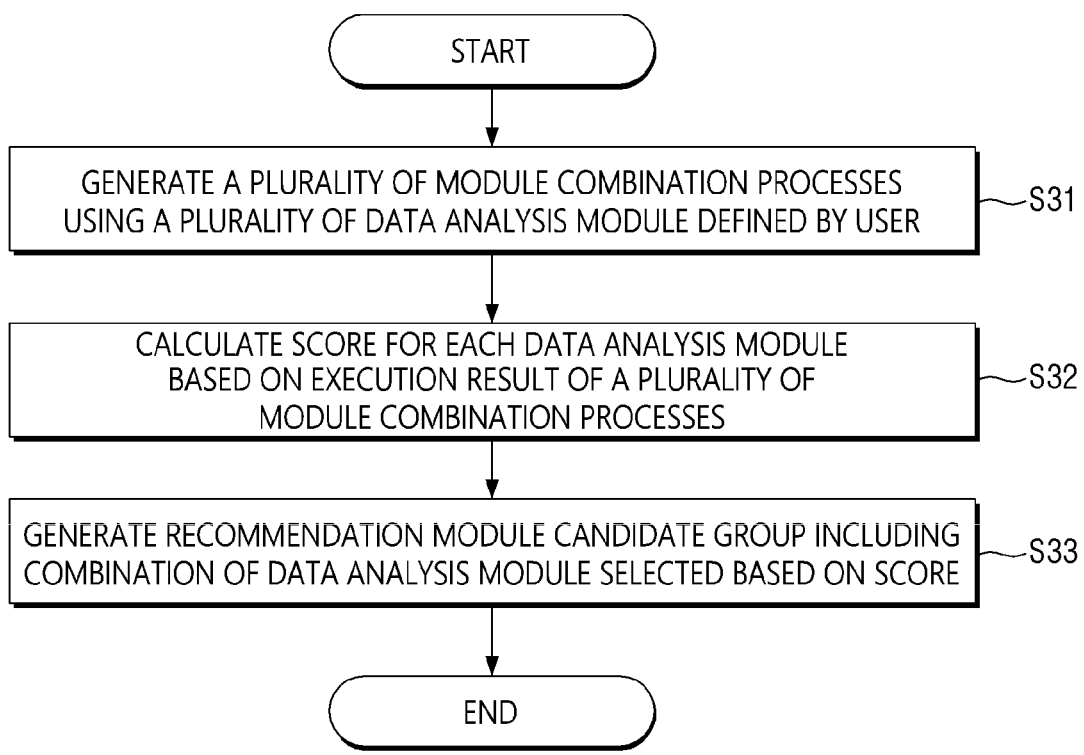
FIGS. 3 and 4 are flowcharts for describing a data analysis method according to an embodiment of the present invention.
Figure 4:
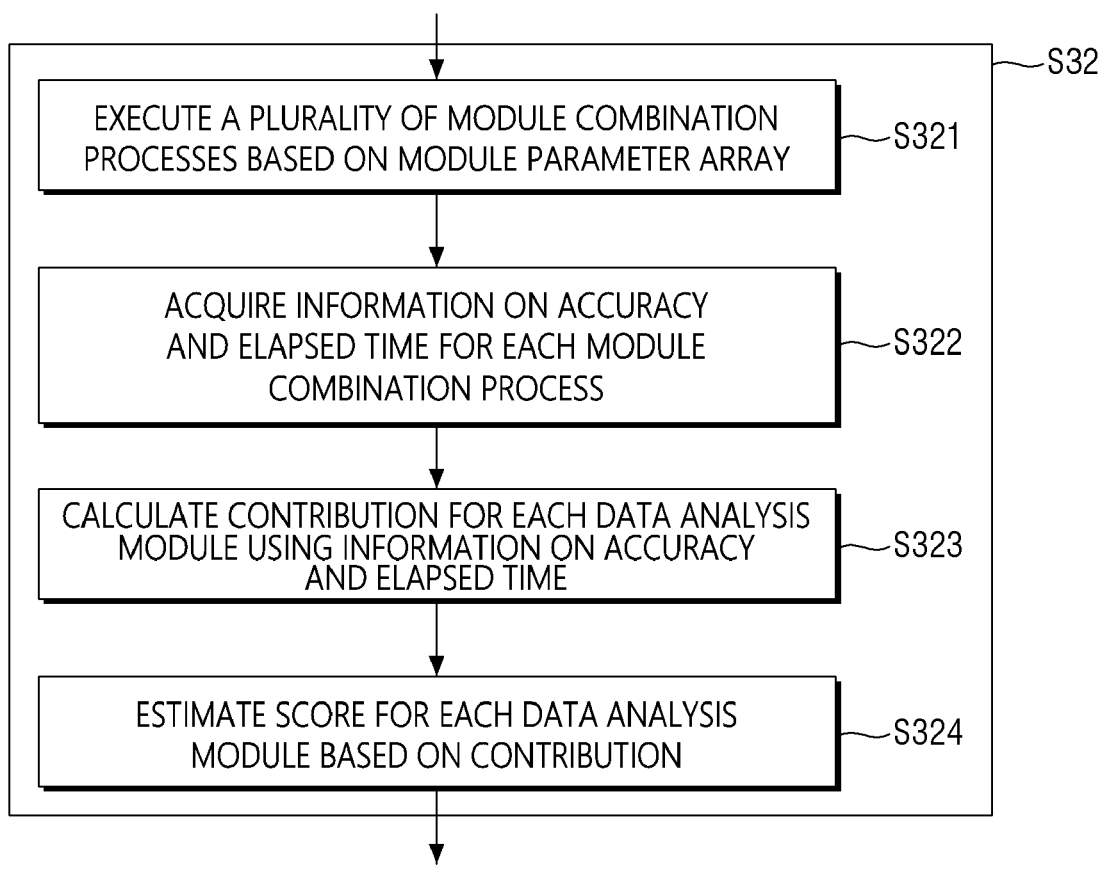

FIGS. 3 and 4 are flowcharts for describing a data analysis method according to an embodiment of the present invention. The data analysis method according to the present embodiment may be executed by a computing device, for example, may be executed by the data analysis apparatus 100.

The computing device executing the method according to the present embodiment may be a computing device having a program development environment or a computing device having an application program execution environment. Note that a description of a subject performing some operations included in the method according to the present embodiment may be omitted, and in such a case, the subject is the computing device.

Referring to FIG. 3, first, in operation S31, a plurality of module combination processes are generated using a plurality of data analysis modules defined by a user.

Here, the data analysis module may include a minimum unit analysis algorithm used in connection with classification, clustering, and embedding vectors, and may be applied to various types of data, such as text data, numerical data, and image data. As an embodiment, the data analysis module may include various statistical techniques and machine learning algorithms used in data pre-processing or analysis model development.

As an embodiment, operation S31 may include an operation of setting a module combination process using all the analyzable combinations of each data analysis module. That is, the module combination process is a process in that a combination of all data analysis modules applicable at each stage of data analysis is generated, and each combination is generated as one process unit. For example, a plurality of module combination processes may be provided in the form of one graph image, such as a module combination graph (see 503 in FIG. 5). Accordingly, the user can visually check the generating process of the module combination process.

As an embodiment, operation S31 may include the operation of generating a module parameter array including parameter information for each data analysis module included in each module combination process.

Figure 8:
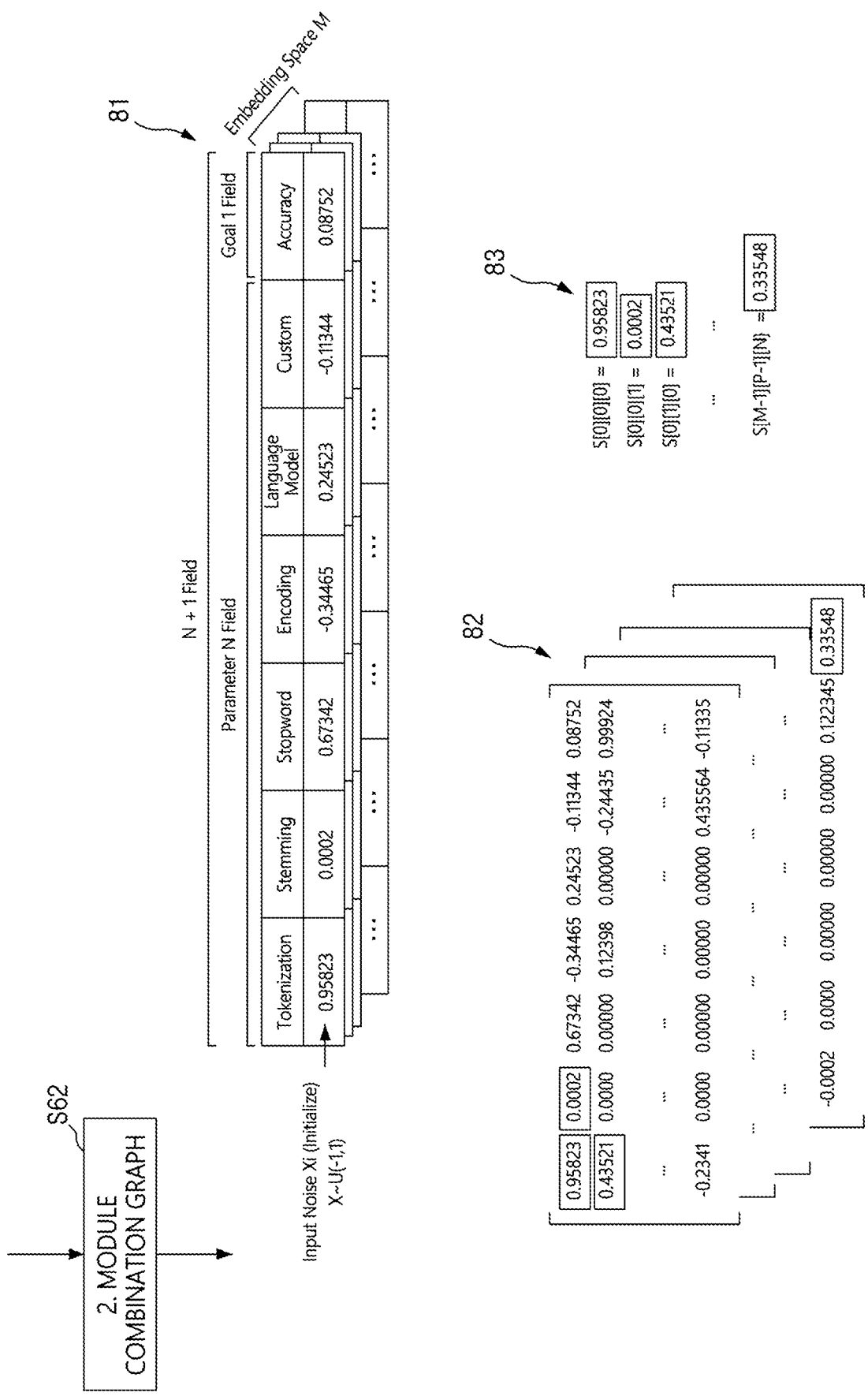
FIGS. 8 to 12 are examples of specific operations performed by the learning unit described with reference to FIG. 7.

Here, the module parameter array may be generated as a three-dimensional array having a data analysis module, a maximum length of a parameter field corresponding to each data analysis module and an embedding space as each dimension. For example, as shown in FIG. 8, in the module parameter array 81, the x-axis represents a data analysis module such as tokenization, stemming, stopword, encoding, language model and an additional module (Custom), and the y-axis represents the maximum length of parameters used in each data analysis module. Further, the z-axis represents a space, in which the embedding vector is stored, and can be flexibly determined according to the specification of a hardware.

Next, in operation S32, a score for each data analysis module is calculated based on the execution result of the plurality of module combination processes. Here, referring to FIG. 4, operations S321 to S324 may be included as detailed operations of operation S32.

As an embodiment, in operation S321, a plurality of module combination processes are executed based on the module parameter array, and in operation S322, information on accuracy and elapsed time for each module combination process is acquired.

Next, in operation S323, the contribution of each data analysis module is calculated using the information on the accuracy and the elapsed time, and in operation S324, a score for each data analysis modules is estimated based on the contribution.

As an embodiment, when calculating the contribution in operation S323, an operation of updating parameter information of each of the data analysis modules included in the module parameter array based on a difference value between the accuracy of each module combination process may be further comprised. At this time, a back propagation type neural network model may be used to update parameter information of the data analysis module.

Finally, in operation S33, a recommendation module candidate group including a combination of data analysis modules selected based on the score is generated.

As an embodiment, the operation S33 may include an operation of selecting a predetermined number of data analysis modules having a high score among the plurality of data analysis modules based on the calculated score.

Further, operation S33 may include an operation of setting a threshold value based on accuracy for each module combination process and an operation of adjusting the number of recommendation module candidate groups based on the threshold value.

As described above, according to the data analysis method according to the embodiment of the present invention, there is an advantage in that recommendation information on an optimal analysis method that can be used in each step of the data analysis process can be provided, and the time required for performing each step of the data analysis process can be shorten.

Figures 5, 6:
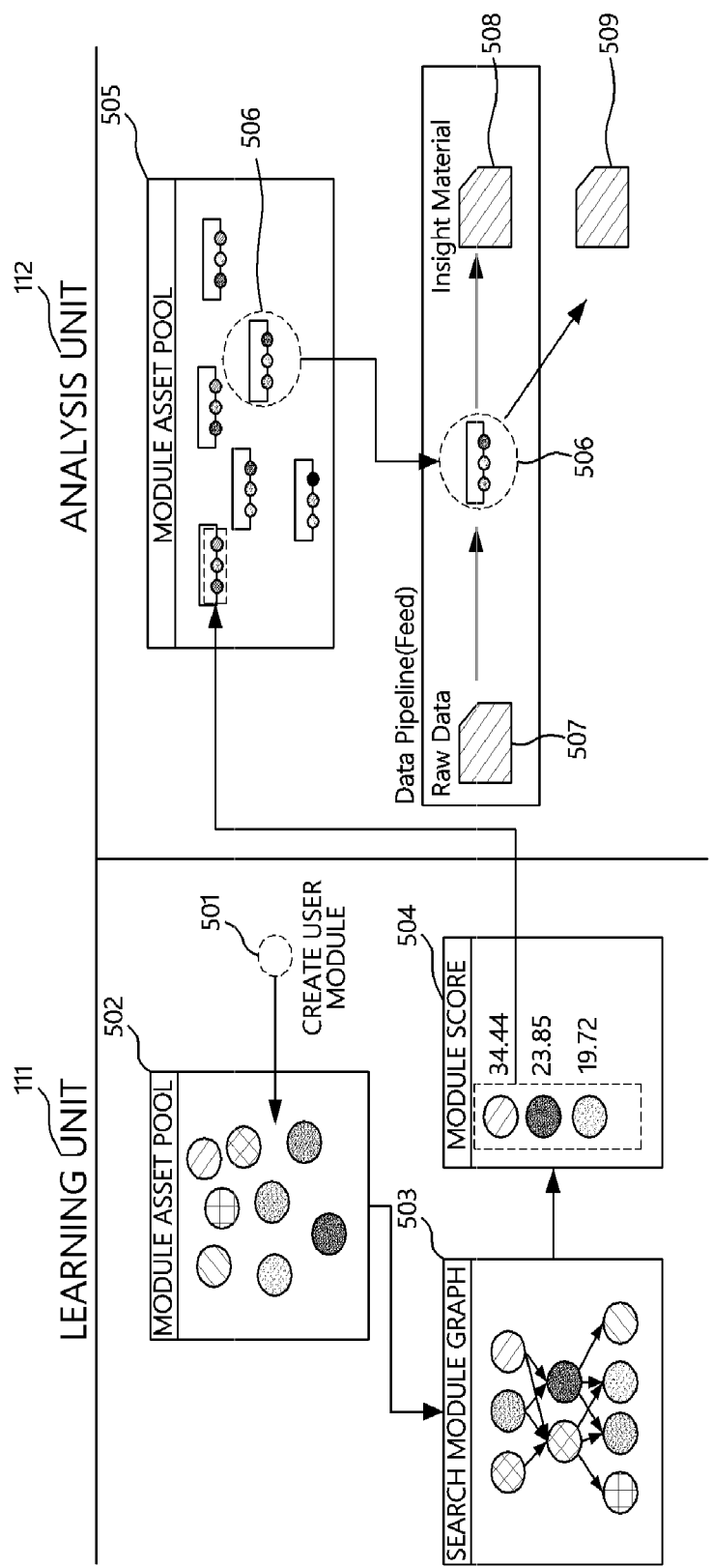
FIG. 5 is an example showing an operation performed by the learning unit and the analysis unit described with reference to FIG. 1.
FIG. 6 is a formula for calculating the score of the data analysis module in the data analysis method described with reference to FIG. 3.

FIG. 5 is an example showing an operation performed by the learning unit and the analysis unit described with reference to FIG. 1. As shown, the server 110 of the data analysis apparatus 100 according to the embodiment of the present invention includes the configuration of the learning unit 111 and the analysis unit 112.

The specific operations performed by the learning unit 111 and the analysis unit 112 are as follows.

In the illustrated example, the learning unit 111 first generates a plurality of module combination graphs 503 connecting various combinations of data analysis modules from the module asset pool 502 that manages a plurality of data analysis modules 501 created by the user of the user terminal 10.

The learning unit 111 calculates a score 504 for each data analysis module through a search process of repeatedly executing a plurality of module combination graphs 503.

The analysis unit 112 uses the score 504 of each data analysis module calculated by the learning unit 111 to generate an analysis recipe pool 505 including a plurality of analysis recipe candidates combining data analysis modules having a high score.

The analysis unit 112 performs data analysis by applying the analysis recipe candidate 506 selected from the analysis recipe pool 505 to the original data 507 stored in the data storage unit 30. Accordingly, the analysis unit 112 may output the insight data 508 and the report 509 as a data analysis result, to which the recipe candidate 506 is applied.

As described above, according to an embodiment of the present invention, faster access to data analysis is possible by assetizing a module for data analysis and recommending an experiment plan by an optimal module combination to a beginner analyst. Further, the assetized module can be assembled in a block concept to quickly generate an analysis method and shorten the time required for the analysis process to induce quick decision making.

FIG. 6 is a formula for calculating the score of the data analysis module in the data analysis method described with reference to FIG. 3. FIG. 6 corresponds to operation S32 of FIG. 3 and shows a score calculation formula 51 for calculating a score for each data analysis module. For example, the learning unit 111 of FIG. 5 may calculate a score 504 for each data analysis module using a score calculation formula 51 through a search process of repeatedly executing a plurality of module combination graphs 503.

The score calculation formula 51 of each data analysis module includes ACP(i) (Accuracy Contribute Point) and Elapsed Time(i) as main variables. Here, i is a unique sequence number for indicating each data analysis module, ACP(i) represents the score that the data analysis module(i) contributes to the accuracy of the module combination process, and Elapsed Time(i) represents the elapsed time of the module(i). Further, w1, w2, and w3 represent weights determined according to domains, and e is a calculation constraint index according to the performance of the system, and is adjusted to a value between 0 and 1 according to the environment, in which the system is implemented.

According to the score calculation formula 51, the score of each data analysis module may be calculated based on the degree of contribution to the accuracy of each of a plurality of module combination processes (e.g., module combination graph 503) by each data analysis module and the elapsed time of each data analysis module.

For example, in calculating the score 504 of each data analysis module by using the score calculation formula 51, the learning unit 111 may calculate the estimated value for Fj[Score(J)] of module j by using the accuracy and elapsed time that is a result value obtained by executing the entire module combination graph 503 grouped in graph unit such that the corresponding value becomes the function F[Max(Accuracy),Min(Elapsed Time)] that maximizes the accuracy and minimizes the elapsed time. At this time, the estimated value of the accuracy and the elapsed time of each module can be calculated through a back propagation method.

According to the embodiment of the present invention as described above, in calculating the score of each data analysis module, the score converted in the form of contribution can be calculated using information on accuracy and elapsed time obtained by generating and executing a plurality of module combination graphs 503 combining each module.

Figure 7:
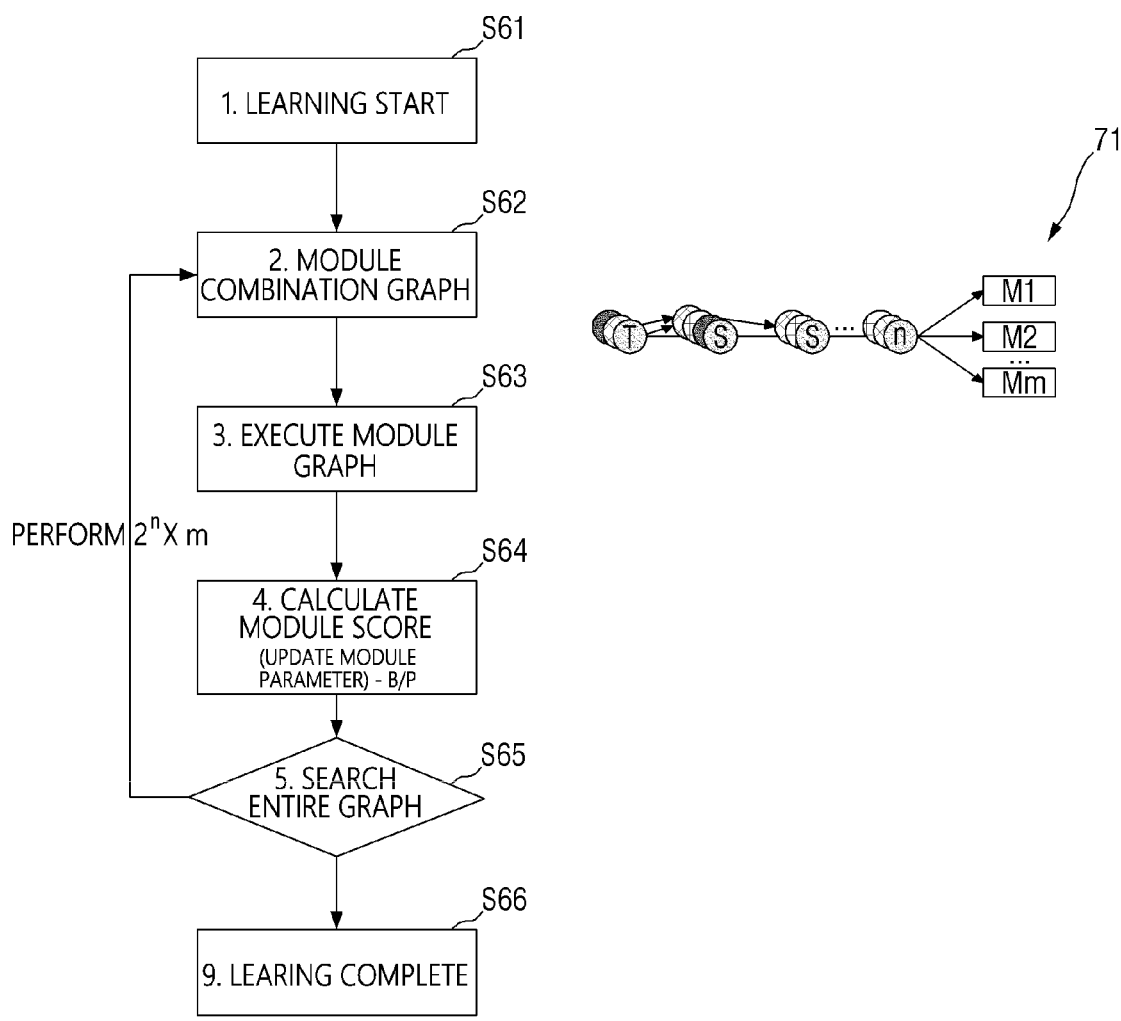
FIG. 7 is a flowchart for describing an operation performed by the learning unit described with reference to FIG. 1.

FIG. 7 is a flowchart for describing an operation performed by the learning unit described with reference to FIG. 1. FIG. 7 corresponds to operations S31 and S32 of FIG. 3, and the method according to the present embodiment may be executed by a computing device, for example, may be executed by the learning unit 111 among components of the server 110 of the data analysis apparatus 100.

First, in operation S61, when learning starts, in operation S62, a module combination graph 71 is generated. Here, the module combination graph 71 may be generated using all possible combinations of a plurality of data analysis modules.

Next, in operation S63, the module combination graph 71 is executed, and in operation S64, the score of each data analysis module is calculated using the results obtained by executing the module combination graph 71. At this time, the score of each data analysis module may be obtained by updating parameter information used in each module to maximize the corresponding value. At this time, in updating the parameter information, a back propagation type neural network model may be used.

In operation S65, the entire module combination graph 71 is searched. That is, by repeatedly performing the execution of the module combination graph 71, parameter information used in each module is finally updated.

Finally, in operation S66, as learning is completed, score calculation for each data analysis module is completed from the result of performing the operation S64.

As described above, according to an embodiment of the present invention, through a search process of repeatedly executing a plurality of module combination graphs 503, a score of each data analysis module may be calculated to provide an indicator for generating a candidate group combining the optimal data analysis module.

FIGS. 8 to 12 are examples of specific operations performed by the learning unit described with reference to FIG. 7.

Referring to FIG. 8, in operation S62, a module parameter array 81 including parameter values for each data analysis module included in the module combination graph 71 is generated.

As an embodiment, the module parameter array 81 may be generated in the form of a three-dimensional array having a data analysis module, a maximum length of a parameter field corresponding to each data analysis module and an embedding space as each dimension.

In the illustrated example, in the module parameter array 81, the x-axis may represent a data analysis module such as tokenization, stemming, stopword, encoding, language model, and additional module (Custom), and the v-axis may represent the maximum length of parameters used in each data analysis module. Further, the z-axis represents a space, in which the embedding vector is stored, and can be flexibly determined according to a specification of a hardware such as CPU, GPU, and memory.

In each cell of the module parameter array 81, Xi, which is a parameter value for each module having a uniform distribution within a range of −1 and 1, is input, and may be initialized when the module parameter array 81 is generated.

As an example, looking at the snapshot 82 of the module parameter array 81, there is a total of N+1 items including N data analysis modules and accuracy in the x-axis direction, and there is a maximum of P parameter items for each data analysis module in the y-axis direction. There are M spaces, in which the embedding vector is stored, in the Z-axis direction.

From this, the value 83 of each cell of the module parameter array 81 may be stored corresponding to the corresponding location, such as S([M−1][P−1][N]) =0.33548, according to the notation system 83 of the three-dimensional array.

Figure 9:
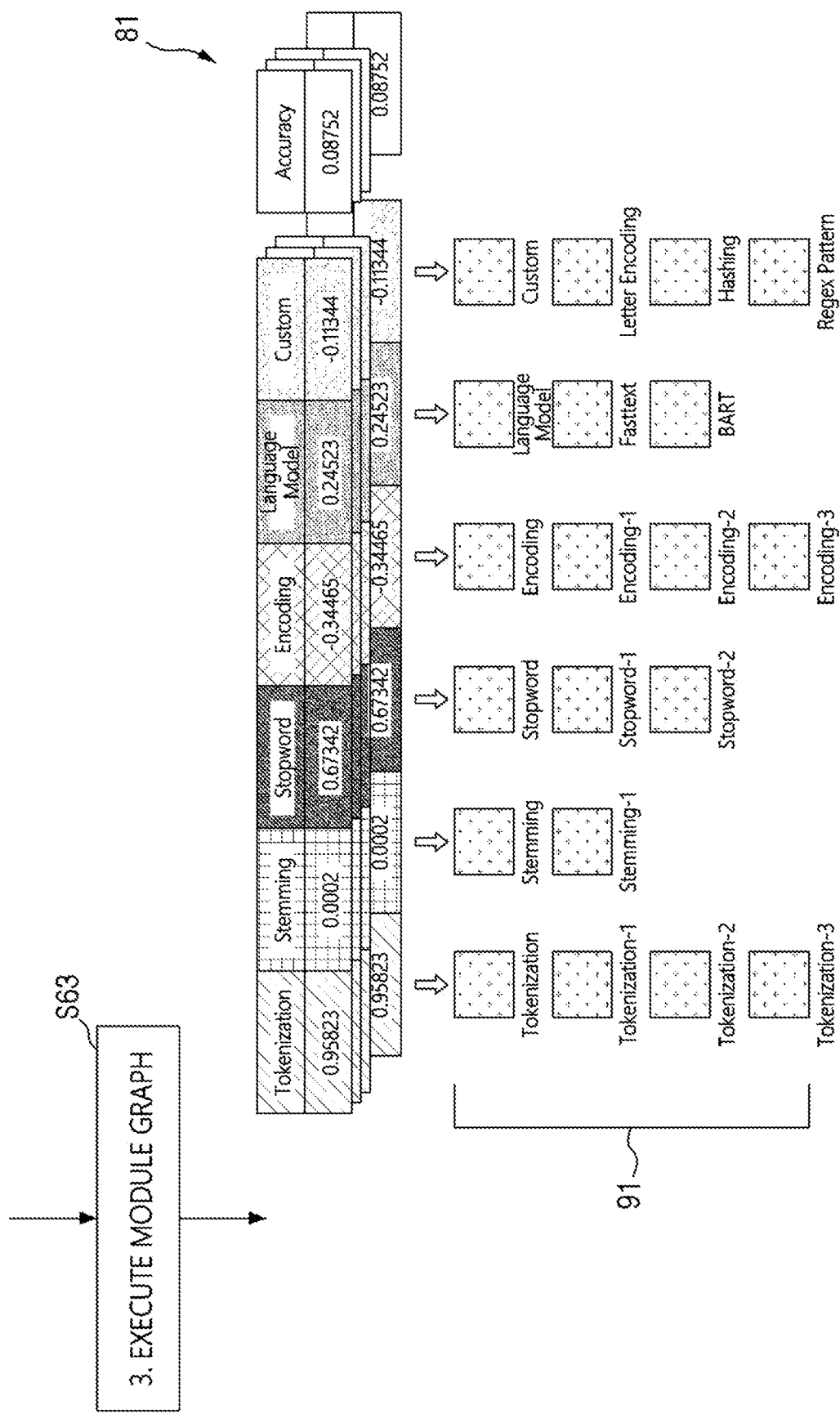

Referring to FIG. 9, in operation S63, the entire module combination graph 71 is executed based on the module parameter array 81 initialized in operation S62. Accordingly, the data analysis module 91 for each module group generated by updating the parameter values included in the module parameter array 81 may be provided whenever the module combination graph 71 is executed. For example, the data analysis module 91 for each module group may include a plurality of modules included in each module group such as tokenization, stemming, stopword, encoding, language model, and additional model (Custom). For example, modules such as Tokenization-1, Tokenization-2, and Tokenization-3 may be included in a module group related to tokenization, and modules such as Fasttext and BART may be included in a module group related to language models.

Figure 10:
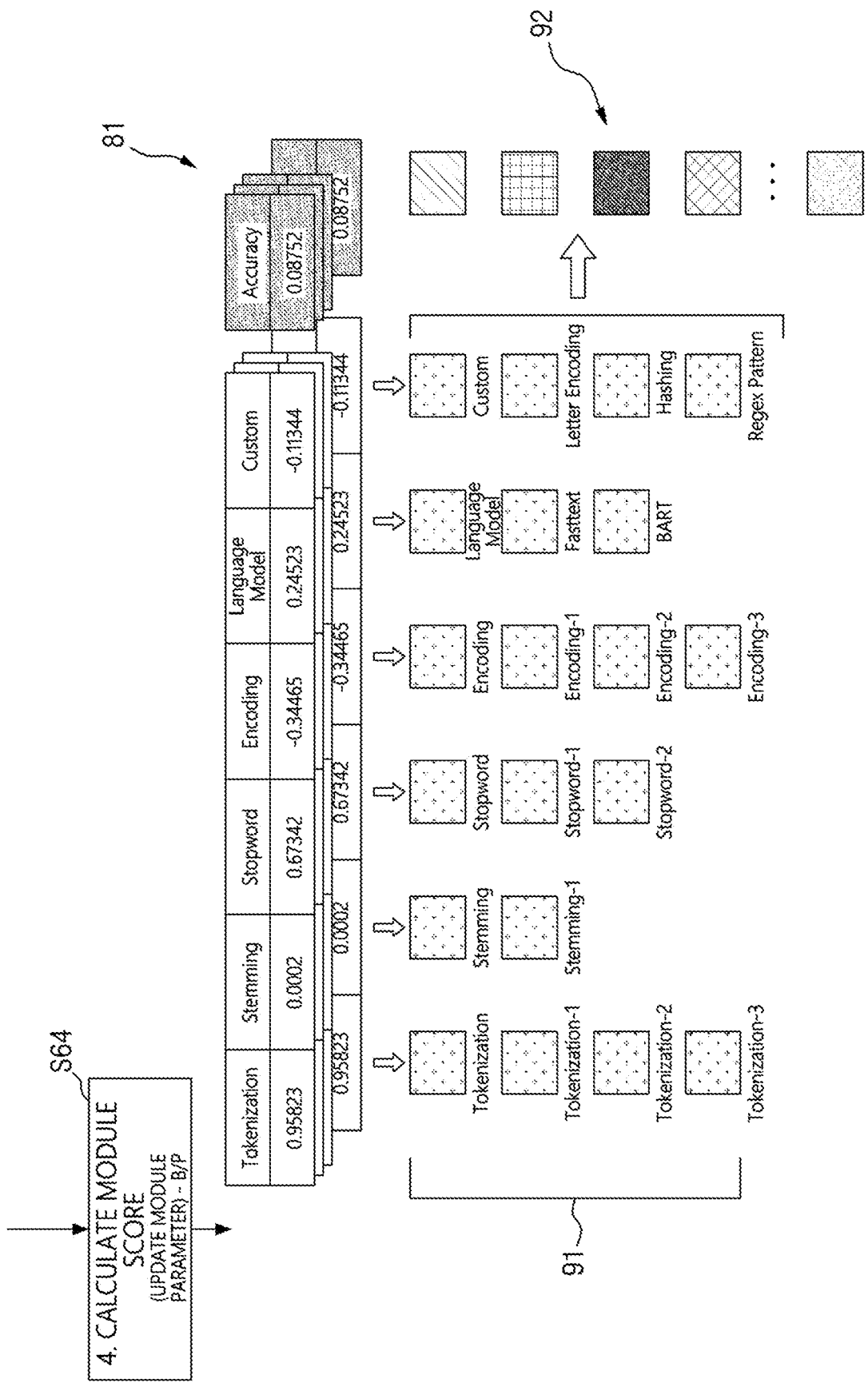

Referring to FIG. 10, in operation S64, the score 92 of each data analysis module is calculated using the results obtained by executing the module combination graph 71. As an embodiment, as a result of executing the module combination graph 71, accuracy for each of the module combination graph 71 is acquired, and a reward or penalty may be granted for each module combination graph 71 using the acquired accuracy. For example, a reward may be granted to the module combination graph 71 that has reached relatively high accuracy, and a penalty may be granted to the module combination graph 71 that has reached relatively low accuracy.

Here, in order to grant a reward or penalty for each module combination graph 71, the accuracy of each module combination graph 71 may be compared and the difference value may be applied. For example, by updating the parameter values of each data analysis module using the accuracy of each module combination graph included in the module parameter array 81, a reward or penalty may be granted for each module combination graph 71.

Figure 11:
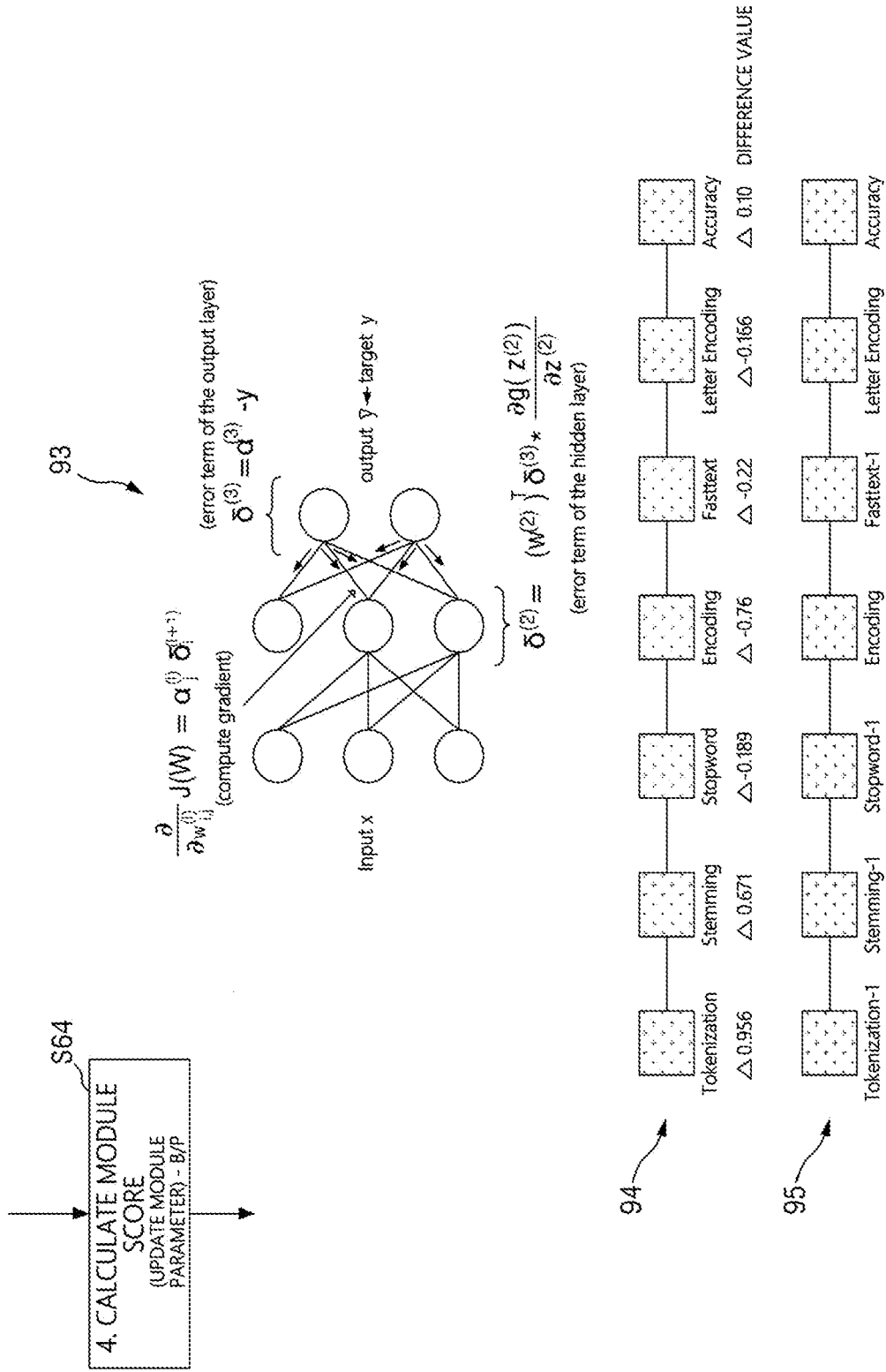

Referring to FIG. 11, in performing operation S64, a back propagation type neural network model 93 may be used to calculate a score 92 of each data analysis module.

For example, the score 92 of each data analysis module may be calculated by updating the parameter values 94 and 95 of each data analysis module included in the module parameter array 81 using difference values between the accuracy of each module combination graph 71.

Figure 12:
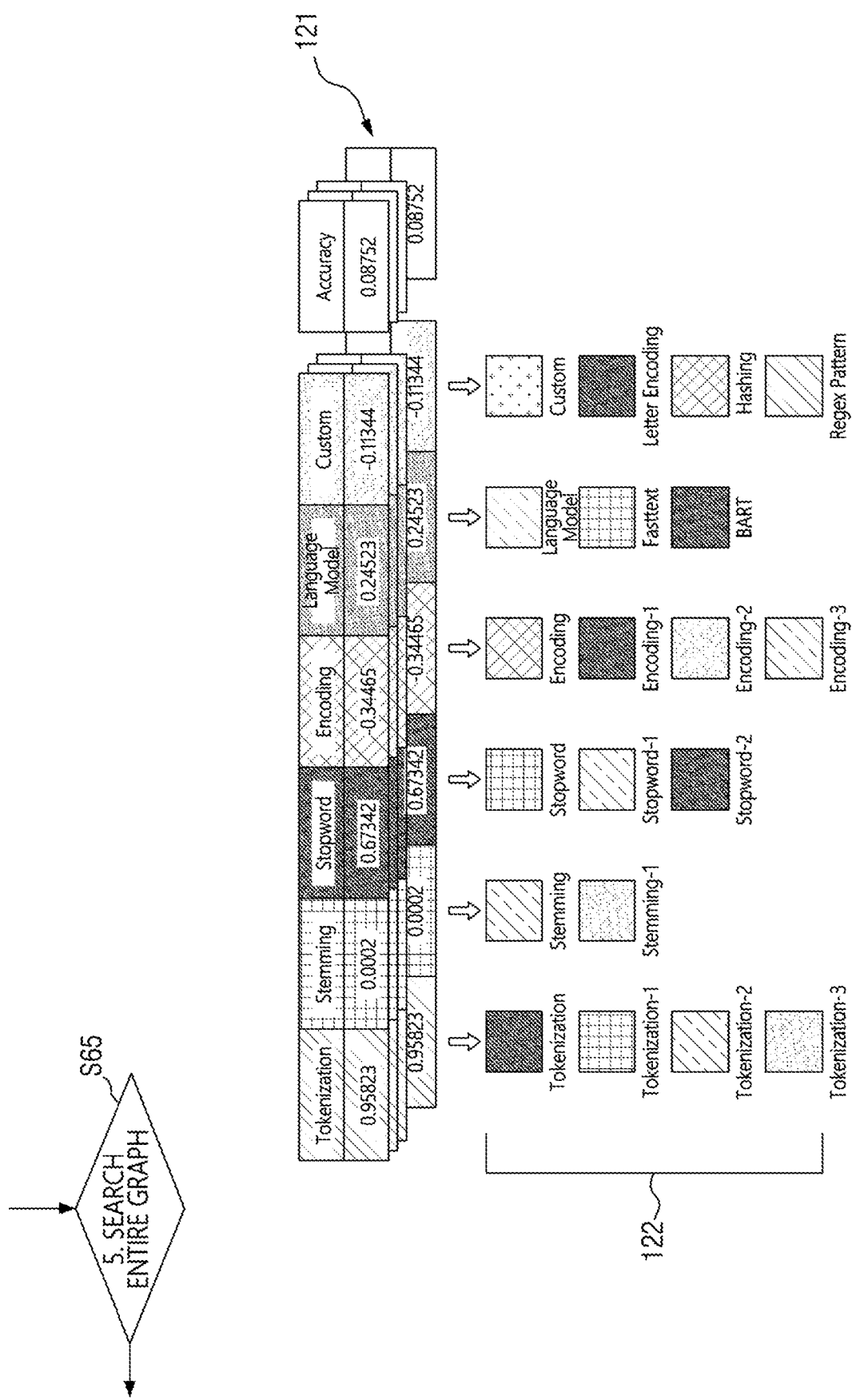

Referring to FIG. 12, in operation S65, the entire module combination graph 71 is searched. That is, the parameter values of each data analysis module included in the module parameter array 121 are finally updated by executing the entire module combination graph 71. Accordingly, a data analysis module having a high parameter value among each module group such as Tokenization, Stemming. Stopword, Encoding, Language model, and Custom can be sorted in order 122. In this way, scores can be calculated for each data analysis module.

Figure 13:
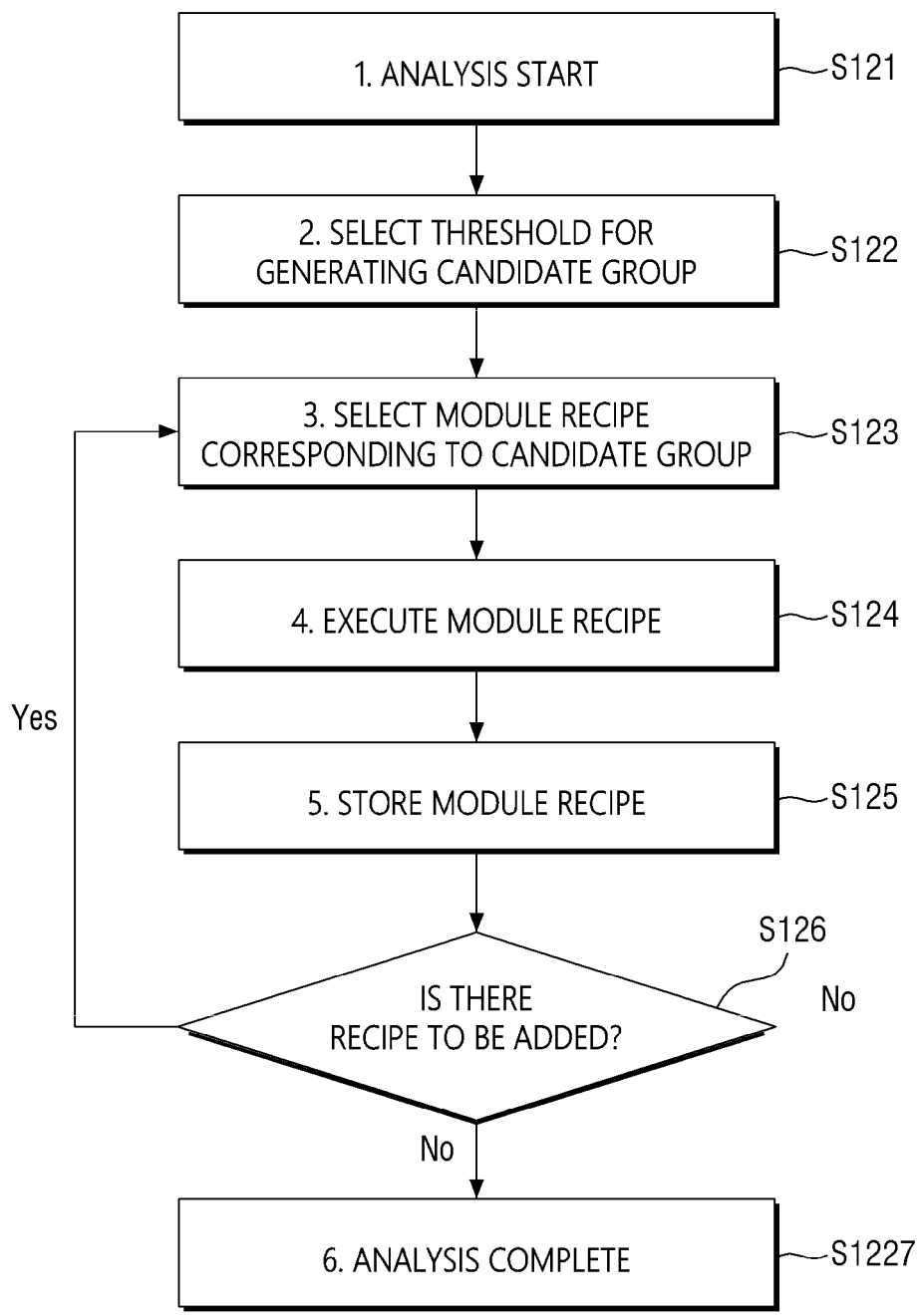
FIG. 13 is a flowchart for describing an operation performed by the analysis unit described with reference to FIG. 1.

FIG. 13 is a flowchart for describing an operation performed by the analysis unit described with reference to FIG. 1. FIG. 13 corresponds to operation S33 of FIG. 3, and the method according to the present embodiment may be executed by a computing device, for example, may be executed by the analysis unit 112 among the configuration of the server 110 of the data analysis apparatus 100.

First, in operation S121, when analysis is started, in operation S122, a threshold value for generating a candidate group that includes a combination of optimal data analysis modules is selected. In one embodiment, the threshold value may be set to the number of modules for each module group such that each data analysis module belongs to a candidate group.

As another embodiment, a threshold value for generating a candidate group may be set based on the accuracy of each module combination graph acquired by the learning unit 111. For example, a threshold value may be set using a relative ratio of accuracy by scale conversion.

Next, in operation S123, a module combination recipe corresponding to the candidate group is selected using the threshold value selected in operation S122.

As illustrated in FIG. 14, when the data analysis modules are sorted in the order of highest score for each module group using the scores previously calculated by the learning unit 111, a candidate group may be generated using the threshold value. That is, when a threshold value is selected as a high value in operation S121, one module combination recipe 131 including a combination of modules having the highest score may be selected as a candidate group. If the threshold value is selected as a low value in operation S121, a plurality of module combination recipes 132 may be selected as a candidate group.

Next, in operation S124, the module combination recipe selected as the candidate group is executed and stored in operation S125. Further, in operation S126, when there is no module combination recipe to be added, the analysis is completed in operation S127.

As described above, according to the data analysis method according to the embodiment of the present invention, it is possible to recommend an optimal analysis method that can be used in each step of the data analysis process. Further, it is possible to shorten the time required to perform each step of the data analysis process.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM. RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method performed by a data analysis apparatus comprising:
   generating a plurality of module combination processes using a plurality of data analysis modules defined by a user;
   calculating a score for each of the data analysis modules based on an execution result of the plurality of module combination processes; and
   generating a recommendation module candidate group including a combination of data analysis modules selected based on the score,
   wherein generating the plurality of module combination processes comprises,
   generating a module parameter array including parameter information for each of data analysis modules included in the respective module combination processes,
   wherein generating the module parameter array comprises,
   generating a three-dimensional array having the data analysis module, a maximum length of a parameter field corresponding to the respective data analysis modules and an embedding space as each dimension; and
   initiating the three-dimensional array.

2. The method performed by a data analysis apparatus of claim 1,
   wherein each of the plurality of data analysis modules includes a minimum unit analysis algorithm used in connection with classification, clustering and an embedding vector.

3. The method performed by a data analysis apparatus of claim 1,
   wherein generating the plurality of module combination processes comprises,
   setting the module combination processes using all the analyzable combinations of each of the data analysis modules.

4. The method performed by a data analysis apparatus of claim 1,
   wherein calculating a score for each of the data analysis modules comprises,
   acquiring information on accuracy and elapsed time for each of the module combination processes by executing the plurality of module combination processes based on the module parameter array;
   calculating contribution of each of the data analysis modules using the information on accuracy and elapsed time; and
   estimating a score for each of the data analysis modules based on the contribution.

5. The method performed by a data analysis apparatus of claim 4,
   wherein calculating a score for each of the data analysis modules further comprises,
   updating parameter information of each of the data analysis modules included in the module parameter array based on a difference value between accuracy of each of the module combination processes.

6. The method performed by a data analysis apparatus of claim 4,
   wherein calculating a score for each of the data analysis modules comprises,
   updating parameter information of a data analysis module included in each of the module combination processes using a back propagation method.

7. The method performed by a data analysis apparatus of claim 4,
   wherein generating the recommendation module candidate group comprises,
   selecting a predetermined number of data analysis modules having a high score among the plurality of data analysis modules based on the calculated score.

8. The method performed by a data analysis apparatus of claim 4,
   wherein generating the recommendation module candidate group comprises,
   setting a threshold value based on accuracy for each of the module combination processes; and
   adjusting the number of the recommendation module candidate group based on the threshold value.

9. A data analysis apparatus comprising:
   one or more processors;
   a communication interface communicating with an external device;
   a memory for loading a computer program performed by the processor; and
   a storage for storing the computer program, wherein the computer program comprises instructions for performing operations comprising, generating a plurality of module combination processes using a plurality of data analysis modules defined by a user, calculating a score for each of the data analysis modules based on an execution result of the plurality of module combination processes, and generating a recommendation module candidate group including a combination of data analysis modules selected based on the score, wherein generating the plurality of module combination processes comprises, generating a module parameter array including parameter information for each of data analysis modules included in the respective module combination processes, wherein generating the module parameter array comprises, generating a three-dimensional array having the data analysis module, a maximum length of a parameter field corresponding to the respective data analysis modules, and an embedding space as each dimension; and initiating the three-dimensional array.

10. The data analysis apparatus of claim 9, wherein each of the plurality of data analysis modules includes a minimum unit analysis algorithm used in connection with classification, clustering and an embedding vector.

11. The data analysis apparatus of claim 9, wherein generating the plurality of module combination processes comprises, setting the module combination processes using all the analyzable combinations of each of the data analysis modules.

12. The data analysis apparatus of claim 9, wherein calculating a score for each of the data analysis modules comprises, acquiring information on accuracy and elapsed time for each of the module combination processes by executing the plurality of module combination processes based on the module parameter array;

calculating contribution of each of the data analysis modules using the information on accuracy and elapsed time; and estimating a score for each of the data analysis modules based on the contribution.

13. The data analysis apparatus of claim 12, wherein calculating a score for each of the data analysis modules further comprises, granting a reward or penalty for each of the module combination processes based on accuracy of each of the module combination processes.

14. The data analysis apparatus of claim 12, wherein calculating a score for each of the data analysis modules comprises, updating parameter information of a data analysis module included in each of the module combination processes using a back propagation method.

15. The data analysis apparatus of claim 12, wherein generating the recommendation module candidate group comprises, selecting a predetermined number of data analysis modules having a high score among the plurality of data analysis modules based on the calculated score.

16. The data analysis apparatus of claim 12, wherein generating the recommendation module candidate group comprises, setting a threshold value based on accuracy for each of the module combination processes; and adjusting the number of the recommendation module candidate group based on the threshold value.

* * * * *